United States Patent Office 3,279,248
Patented Oct. 18, 1966

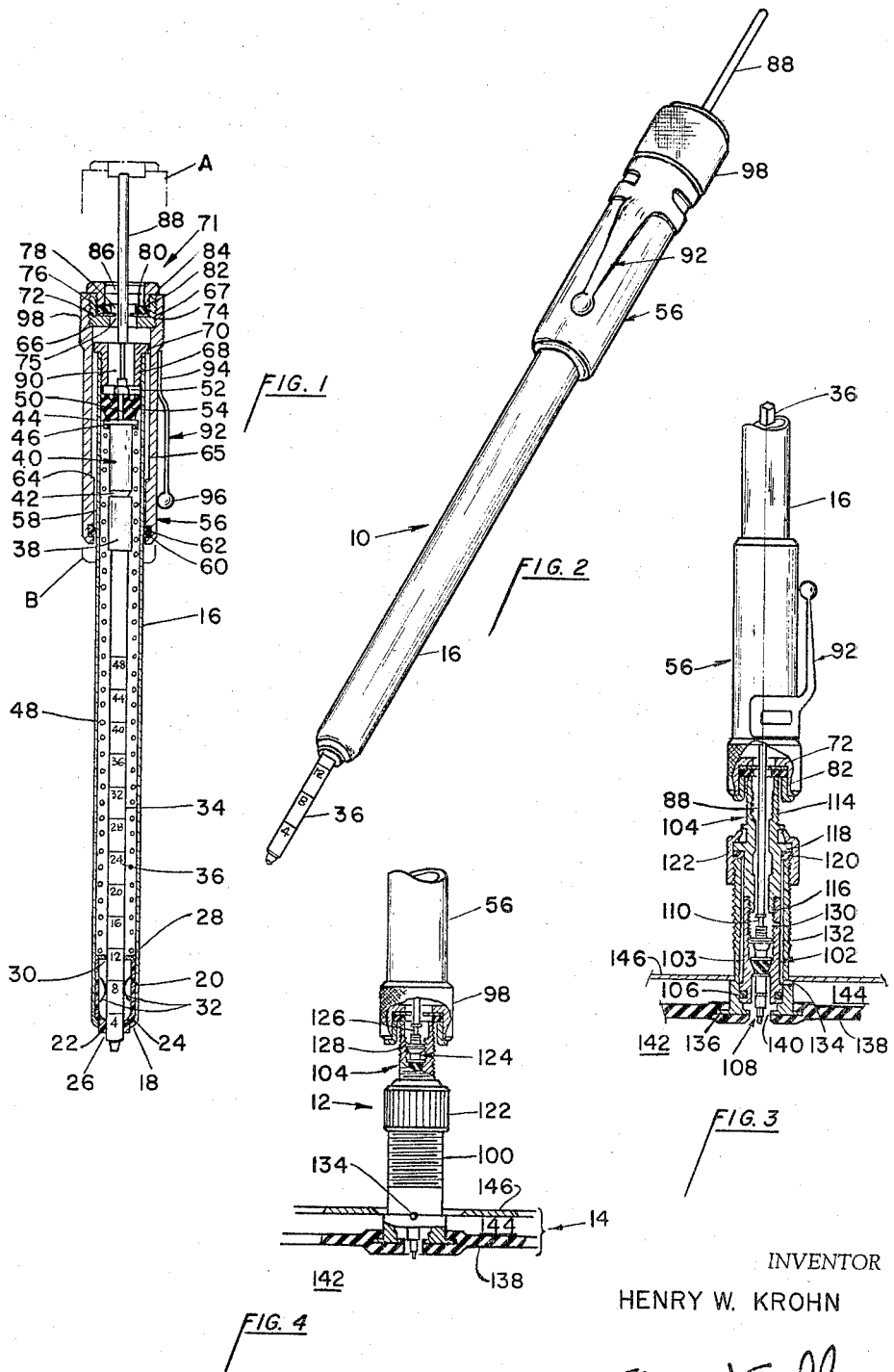

3,279,248
PORTABLE PRESSURE GAUGE FOR A PLURAL CHAMBER PNEUMATIC APPARATUS
Henry W. Krohn, North Olmstead, Ohio, assignor to Eaton Yale & Towne Inc., a corporation of Ohio
Filed Oct. 17, 1963, Ser. No. 316,931
12 Claims. (Cl. 73—146.3)

The present invention pertains to a portable pressure gauge for selectively measuring the pressure within each of a plurality of chambers of a penumatic apparatus.

More particularly, this invention relates to a portable pressure gauge that is so constituted and arranged as to be mutually cooperatively engageable with each of a plurality of superimposed valves of a pluralized valving means to selectively measure the pressure within each of a plurality of chambers of a pneumatic apparatus, such as a pneumatic vehicle tire.

Accordingly, it is a primary object of the present invention to provide a pressure gauge that is so constituted and arranged as to selectively measure the pressure within each of a plurality of chambers of a plural chamber pneumatic apparatus.

A further primary object of this invention is to provide a pressure gauge that is so constituted and arranged as to be mutually cooperatively engageable with each of a plurality of superimposed valves comprising a unitary pluralized valving means that is structurally operatively associated or connected to a plural chamber penumatic apparatus, such as a pneumatic vehicle tire, to selectively measure the pressure within each of a plurality of chambers thereof.

Still further, a primary object of the present invention is to provide a pressure gauge of the portable type having a chuck that is longitudinally slidably moveable and a fixedly positioned valve actuating pin, the extent of longitudinal movement of the chuck being correlated relative to the longitudinal dimensional extent of the pin enabling the latter to extend outwardly of the chuck when the latter is in one of a plurality of positions and mutually cooperatively engage one of a plurality of superimposed valves of a unitary valving means for introducing a fluid into each one of a plurality of chambers of a plural chamber pneumatic apparatus, such as a pneumatic vehicle tire, to selectively measure the pressure in one of said plurality of chambers and enabling said chuck to completely encompass said pin when the former is in another of said plurality of positions, with the latter being in mutual cooperative engagement with another of said plurality of superimposed valves to selectively measure the pressure in another of said plurality of chambers.

Yet another primary object of this invention is to provide a pressure gauge of the portable type that is so constituted and arranged as to selectively measure the pressure within each one of a plurality of chambers of a pneumatic apparatus, such as a pneumatic vehicle tire, having a fluid confined therewithin, by being, in and of itself, mutually cooperatively engageable with first one and then another of a plurality of superimposed valves of a unitary pluralized valving means for introducing said fluid into each of said plurality of chambers.

Another primary object of the present invention is to provide a durable, readily and simply useable pressure gauge of the portable type that is so constituted and arranged as to be mutually cooperatively engageable with first one and then another of a plurality of superimposed valves of a unitary pluralized valving means that is structurally operatively associated with or connected to a plural chamber pneumatic apparatus, such as a pneumatic vehicle tire, for selectively measuring the pressure in each of said plurality of chambers.

Other objects and important features of the invention will be apparent from a study of the specification following taken with the drawing, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIGURE 1 is a detailed view, partially in section and partially in elevation, of a portable pressure gauge constructed in accordance with the present invention, illustrating in phantom the different positions of certain of the component parts thereof;

FIGURE 2 is a perspective view of the portable pressure gauge of FIGURE 1;

FIGURE 3 is a detailed view, partially in section and partially in elevation, of the portable pressure gauge of FIGURES 1 and 2 in operative association with a unitary pluralized valve means for measuring the pressure in one of a plurality of chambers of a plural chamber pneumatic apparatus, such as a vehicle tire; and FIGURE 4 is a view similar to FIGURE 3, illustrating the pressure gauge in operative association with the valve means for measuring the pressure in another of the plurality of chambers.

With reference now to the drawing, there is illustrated therein a portable pressure gauge or portable pressure measuring means 10 that is particularly constituted and arranged for use with a unitary or common pluralized valve or valving means 12, enabling the gauge to selectively measure and determine the pressure in each of a plurality of chambers of a plural chamber pneumatic apparatus 14, such as a pneumatic tire suitable for use with a self-propelled vehicle.

The pressure gauge or pressure measuring means 10 comprises a longitudinally dimensionally extensive annularly or cylindrically configured tube or hollow shell 16, fabricated in any suitable manner and of any suitable material, such as brass tubing that is subsequently nickel plated. One end 18 of the tube 16 is turned generally radially inwardly to maintain positioned or disposed within the tube a plug 20. The plug may be fabricated in any suitable manner and of any suitable material, such as a hardened nylon, and has an extension 22 extending longitudinally outwardly thereof at one of its ends. The diameter of the extension 22 is less than that of the body of the plug 20 forming a shoulder 24 for mutual cooperative engagement with the end 18 of the tube 16. In this manner, it is considered readily apparent that the plug 20 is precluded from falling outwardly of the tube 16. The extension 22 has an aperture 26 positioned therewithin and extending therethrough, which aperture is of generally the same configuration as an indicating stem 34, which will be described more fully hereinafter. A washer or spring retainer or abutment 28 is disposed in any suitable manner, with respect to the other end of the plug 20, in overlying relationship relative thereto and has an aperture 30 extending therethrough. The aperture 30 is of the same general configuration as the aperture 26, that is, generally corresponding to the configuration of the indicating stem 34. It is to be understood that the peripheral configuration and greatest diameter of each of the plug 20 and the washer 28 correspond, respectively, to the configuration and diameter of the inner wall or interior of the tube 16. Similarly, since the extension 22 extends through the aperture 26 at the end 18 of the tube 16, the configuration and diameter of each are generally the same.

A friction means for maintaining the stem in any one of a plurality of positions and comprising a plurality of friction springs 32 is positioned within and relative to the plug 20. These springs 32, which may be fabricated in any suitable manner and of any suitable material, such as a spring steel, are so positioned, constituted and arranged as to present a pressure or force directed generally transversely of the indicating stem 34. In this manner, there is created a frictional force between the stem 34 and the springs 32, enabling the springs to maintain the stem in a non-indicating or inoperative position, as illustrated in FIGURE 1, in which no pressure measurement is indicated, as well as in an indicating position, as illustrated in FIGURE 2, for example, in which a pressure measurement is indicated. Accidental extension of the stem 34 to without the tube 16 is, therefore, precluded. Additionally, inasmuch as the springs 32 hold the stem 34 in an indicating position, such as that of FIGURE 2, accurate measurements of pressure are assured.

The indicating stem 34, which is of a generally rectangular configuration, is positioned within the tube or shell 16 and is longitudinally slidably moveable with respect or relative thereto. The stem may be fabricated in any suitable manner and of any suitable material, such as a hardened nylon, and has positioned thereupon suitable indicia markings 36, such as numerals and generally transversely extending lines, cooperative with the extension 22 of the plug 20, generally at the aperture 26 thereof, for indicating the pressure within a pressurized chamber, in a manner to be described more fully hereinafter.

The upper end of the stem 34 is radially enlarged to form an abutment 38, which abutment is mutually cooperatively engageable with the end 42 of a holder 40. The holder 40 is of generally cylindrical configuration and comprises a generally radially outwardly extending flange or rim 44. Another washer, or spring retainer or abutment 46 is positioned in underlying relationship relative to the flange 44. The spring retainer or abutment 46 functions as an adjustment means for setting the preload of a spring 48. Several such abutments 46 may be used or none may be required depending upon the desired preload setting of spring 48. Biasing means comprising spring 48 is positionable between the spring retainers 28 and 46 and biases the holder 40 in a direction generally vertically upwardly, as viewed in FIGURE 1, or in a direction disposing the stem 34 substantially completely within the tube 16. A rod 50, which may be integral with the holder 40, extends generally outwardly thereof and terminates in an integral flange or rim 52. The latter is diametrically dimensionally smaller than the flange 44 and, in addition to functioning as a component part of the holder 40, functions as a component part of a stop or abutment means, to be described hereinafter, determining the limit of movement of the holder in the aforesaid direction.

A generally cup-shaped sealing means or sealing member 54 is positioned about the rod 50 and between the flanges 44 and 52 of the holder 40, and is longitudinally slidably moveable relative to the tube 16 therewith. This seal may be fabricated in any suitable manner and of any suitable material having the requisite characteristics for the intended purposes and functions thereof, such as an oil resistant Hycar. The holder 40 and sealing member 54, as is considered readily apparent, therefore, conjointly perform the function of a seal and precludes communication thereby between the interior of the tube 16 thereabove and therebelow. Additionally, as will be rendered more apparent hereinafter, the holder 40 and sealing member 54 conjointly perform the function of a pressure responsive actuating means or actuator, inasmuch as the same is positioned to respond to pressure and actuate the indicating stem 34 through the medium of the holder 40 and the abutment 38.

A chuck or sleeve 56 is positioned upon and about the tube 16 and is so constituted and arranged as to be longitudinally slidably moveable upon and relative thereto. To this end, a first bore 58 extends through the chuck and is of an internal diameter substantially equal to the external diameter of the tube 16. The chuck 56 is provided with a sealing means comprising a completely annular groove 60, along the bore 58, within which a conventional O-ring 62 is disposed or positioned, the latter being sealingly mutually cooperatively engageable with the exterior of the tube 16. The chuck 56 is interiorly counter-bored or stepped to provide a first shoulder 64 between the first bore 58 and a second bore 65, which shoulder comprises a component part of a stop or abutment means determining or defining the limit of movement of the chuck in one of a plurality of directions longitudinally of the tube 16. The chuck is again counter-bored or stepped to provide another or second shoulder 66 between the second bore 65 and a third bore 67, for a purpose to be more fully described hereinafter.

A sleeve 68 is positioned or disposed within the end of the tube 16 opposite the end 18 thereof. The sleeve may be fabricated in any suitable manner and of any suitable material, such as brass, and is fixedly positioned relative to the tube, as by means of a press fit therewithin. The sleeve 68 comprises a radially outwardly extending flange or rim 70 which is disposed in overlying relationship upon and relative to the end of the tube 16 adjacent thereto. The diametric dimensional extent of the flange 70 is substantially equal to that of the second bore 65 and, therefore, is somewhat greater than that of the tube 16, thus extending generally radially outwardly thereof. The sleeve 68 comprising the flange 70, therefore, comprises another component part of the stop or abutment means for determining or defining the limit of movement of the chuck 56 in each of a plurality of directions longitudinally of the tube 16. In one of said plurality of directions, the flange 70 is mutually cooperatively engageable with the shoulder 64, as described above.

In another of said plurality of directions, the flange 70 is mutually cooperatively engageable with a chuck ring 72, the same being press-fitted within the bore 67 and fixedly positioned or seated upon the shoulder 66. The chuck ring 72 is mutually cooperatively engageable with the flange or rim 70 and comprises still another component part of the abutment or stop means determining or defining the limit of movement of the chuck 56 in each of a plurality of directions longitudinally of the tube 16. Said means comprises, therefore, and as pointed out above, the flange 70, the shoulder 64 and the chuck ring 72, the flange being mutually cooperatively engageable with the shoulder in one of said plurality of directions and with the chuck ring another of said plurality of directions.

As pointed out above, the gauge 10 is mutually cooperatively engageable with the unitary or common valve means 12 to selectively measure the pressure within each of a plurality of pressure chambers of the pneumatic apparatus 14. To this end, the chuck 56 is provided with a mouth 71 comprising a washer 74 having a generally centrally disposed aperture 75 extending therethrough, and being positioned within the chuck ring 72. A packing ring 76 is positioned upon the washer 74 and within the chuck ring, which packing ring comprises a generally centrally disposed aperture 78 extending therethrough and an outwardly and annularly extending contact rim 80. A retainer ring 82 is press-fitted within the chuck ring 72, to retain the packing ring 76 therewithin, and comprises radially outwardly extending annular rim 84 of such diametric dimensional extent as to be disposed in overlying relationship relative to the chuck ring 72 and partially of the chuck 56.

A generally centrally disposed aperture 86 is positioned and extends through the retainer 82, which aperture is of a greater diametric dimensional extent than the aperture 78, extending through the packing 76. In turn, the aperture 78 is of a greater diametric dimensional extent than the aperture 75. The diameter of the latter is just slightly greater than the diameter of a valve actuating pin 88, in which manner the washer 74 precludes any flexure or bending of the pin.

The valve actuating pin 88 comprises an integral base or plug 90 fixedly positioning the pin relative to the sleeve 68. This may be accomplished in any suitable manner, as by constituting and arranging the base or plug to be press-fitted within the sleeve. It is to be understood, however, that the base or plug 90 is to be so configured and arranged as to provide a passageway thereabout and between the sleeve 68, enabling fluid pressure to be communicated to the pressure responsive valve actuating means 54. As an example, the plug 90 may have a diamond configuration. Moreover, the base or plug 90 is abuttingly mutually cooperatively engageable with the flange 42 of the holder 40, the latter functioning additionally as a stop or abutment means, as pointed out above, to determine the limit of movement of the holder in a direction longitudinally of the tube 16 enabling the indicating stem 36 to be substantially completely disposed within and relative to the said tube.

A resilient metal clip 92, fabricated in any suitable manner and of any suitable material, such as a heat-treated spring steel, is positioned about the chuck 56. This may be accomplished in any suitable manner, as by providing the clip with an integral split generally annular band 94. Additionally, the clip 92 is provided with an integral bulb 96 to maintain the gauge 10 in position relative to, for example, an individual's pocket. To facilitate handling of the gauge 10, the chuck 56 may be peripherally knurled at 98.

The gauge 10 is mutually cooperatively engageable with the unitary or common pluralized valve means 12, as pointed out above, to enable an individual to selectively measure the pressure within each of a plurality of chambers of a plural chamber pneumatic apparatus 14. With particular reference now to FIGURES 3 and 4, the valve 12 comprises a generally cylindrical exteriorly threaded valve sleeve 100 within which is removeably positioned or disposed a first or inner valve 102 and a second or outer valve 104.

The inner valve 102 comprises a housing 103 having suitable sealing means 106, such as a conventional O-ring, completely annularly and positioned exteriorly thereof and disposed in sealing mutual cooperative engagement with the sleeve 100. The valve 102 comprises, further, a valve core 108 of any suitable conventional construction, which valve core comprises, in turn, a normally biased closed manually actuatable valve, as is considered readily apparent to those skilled in the art. The valve core 108, being biased to a closed position, normally precludes communication to and within an inner chamber, to be defined more fully hereinafter, of the pneumatic apparatus 14. To provide such communication, the valve core 108 is provided with a valve stem 110 operable to open the valve therewithin.

The outer valve 104 is similar to the inner valve 102 and comprises a housing 114 that is exteriorly threaded for cooperation with a valve cap (not shown). The housing 114 and, thus, the valve 104, is positioned upon and superimposed relative to the housing 103 and, thus, the valve 102. To this end, the housing 114 comprises an exteriorly threaded extension 116 threadedly mutually cooperatively engageable with the threads of the housing 103. Since the valves 102 and 104 are connected together, as just described, both are simultaneously positioned within the sleeve 100. To this end, the housing 114 is provided with a radially outwardly extending annular flange or rim 118 disposable in overlying relationship relative to the end of the sleeve 100 adjacent thereto. Suitable packing 120 is positionable between that end of the sleeve and the rim 118. In accordance with this construction, it can be seen that both valves 102 and 104 can be removed from the sleeve 100 as a unit. To fixedly position both valves within the sleeve, a cap or collar 122 is rotatably positioned upon the housing 114 and is interiorly threaded for threaded mutual cooperative engagement with the interior threads of the sleeve 100.

Similarly with respect to the valve 102, the valve 104 comprises a valve core 124 that is substantially the same as the valve core 108. The valve core 124 is normally biased to a closed position and precludes communication to and within another or outer chamber, to be described more fully hereinafter, of the pneumatic apparatus 14. To move the valve to an open position providing communication to and within such chamber, a valve stem 126 is provided for manual operation. The core 124 is provided with exterior threads 128 for threaded mutual cooperative engagement with the internal threads of the housing 114. In this manner, when repair of one or more of the component parts of the valve core is required, the same can be removed as a unit from its housing for replacement, as described above in relation to the valve core 108.

In order to provide communication or ingress to and within the outer chamber, to be defined more fully hereinafter, of the pneumatic apparatus 14, it is necessary to provide a passageway from the chamber between the valve cores 108 and 124. To this end, a port 130 extends through the housing 103 and communicates with an annular passage 132 about the housing and between the sleeve 100, as defined by fabricating the housing of less diametric dimensional extent than the internal diameter of the sleeve. A port 134 is positioned and extends through the sleeve 100 to provide communication between the annular passage 132 and the outer chamber.

In accordane with the above construction, it can be seen that rotatably removing the cap 122 relative to the sleeve 100 enables both the inner and outer valves 102 and 104, respectively, to be simultaneously completely removed therefrom. Of course, the outer valve 104 only can be removed by disengaging the threaded extension 116 relative to the housing 103, and rotatably removing the cap 122, as just described. Again, each of the valve cores 108 and 124 comprise self-contained valving units and, as such, are removeable from their respective housings 103 and 114 for replacement when repair of one or more of the component parts thereof is required.

The pluralized valve 12, as is considered readily apparent, is particularly adapted to function as a manually actuatable valve and to provide the ingress of a fluid, such as air, to within each of the plurality of chambers of the plural chamber pneumatic apparatus 14, which apparatus may be a pneumatic vehicle tire. To this end, the lower end of the sleeve 100 comprises a radially outwardly extending annular rim 136, enabling the valve 12 to be connected, in any suitable manner, to the inner wall 138, forming the base of the valve. A centrally disposed aperture 140 is positioned within and extends through the rim 136 to provide ingress to the inner chamber 142 of the apparatus 14. Additionally, as pointed out above, the ports 130 and 134 conjointly with the annular passage 132 provides ingress to another chamber 144, namely, the outer chamber, of the apparatus, as defined by and between an outer wall 146, such as the rim of the pneumatic tire, and the inner wall 138.

The valve 12 may be so constituted and arranged as to supply pressure fluid to each of the chambers 142 and 144 of the pneumatic apparatus simultaneously. This may be accomplished in any suitable manner. For example, the valve stem actuators 110 and 126 of the inner and outer valves 102 and 104 may be of such longitudinal dimensional extent as to mutually, respectively, cooperatively engage one another. In this manner, when the actuator 126 is cooperatively engaged by a conventional pressure fluid supply apparatus (not shown), the same will be pushed longitudinally of the outer valve, causing this actuator, in turn, to cooperatively engage the actuator 110 and move the same longitudinally of the inner valve 102.

Furthermore, it may be desired that the inner chamber 142 always be at a greater pressure than the outer chamber 144. To this end, the aperture 140 extending through the rim is of a greater cross-sectional area and, therefore, is of a greater volumetric capacity than the aperture 134, the latter being determinative of the rate of flow to the chamber 144. In accordance with this construction, it can be seen that a greater amount of fluid will enter the inner chamber 142 in the time it takes to bring the outer chamber 144 up to the desired pressure, depending, of course, upon the relative volumetric capacities of the chambers.

If desired, the wall 138 of the inner chamber 142 may be provided with a pressure relief valve (not shown), of any suitable and conventional construction, for determining and defining the pressure limit within the inner chamber. Such a valve may be conventionally so constituted and arranged as to automatically bleed excess pressure from the inner chamber while in no way interfering with the operation of the valve 12 in supplying fluid to the inner chamber. The pressure relief valve preferably should be adjustable to vary the upper limit of pressure fluid within the container.

It has been previously pointed out that the chuck 56 of the gauge 10 is longitudinally slidably moveable of and relative to the tube 16 thereof. It has also been pointed out that the sleeve 68 conjointly with the shoulder 64 of the chuck and the chuck ring 72 comprise a stop or abutment means for defining or determining the limit of movement of the chuck in each of a plurality of directions longitudinally thereof. It is considered readily apparent, therefore, that the chuck 56 has a plurality of positions, namely, two positions, relative to the tube 16. In FIGURE 4 of the drawing, the chuck is illustrated in one of its positions longitudinally of the tube 16, this position also being partially illustrated in phantom in FIGURE 1 at A. In this position, the chuck is disposed longitudinally outwardly of the tube 16, the limit of movement in this direction being determined by the abutting mutual cooperative engagement of the shoulder 64 with the flange 70 of the sleeve 68. In FIGURES 2 and 3 of the drawing, the chuck 56 is illustrated in another of its positions longitudinally of the tube 16, this position also being partially illustrated in phantom in FIGURE 1, at B. In this position, the chuck is disposed longitudinally inwardly of the tube 16, the limit of movement in this direction being determined by the abutting mutual cooperative engagement of the chuck ring 72 with the flange 70.

In the first of the above described positions, illustrated in FIGURE 4 and in phantom in FIGURE 1, it can be seen that the chuck contains the valve actuating pin 88 generally completely therewithin. Stated in other words, the position of the chuck relative to the tube 16 and the pin 88 is such that the latter does not protrude outwardly of the chuck, or the tube and, therefore, does not protrude outwardly of the gauge 10. However, in the other of the above described positions, illustrated in FIGURES 2 and 3 and in phantom in FIGURE 1, it can be seen that the chuck 56 is positioned longitudinally of the tube 16 such as to enable the pin 88 to protrude longitudinally outwardly of the chuck and, therefore, the gauge. This particular relationship between the chuck 56 and the valve actuating pin 88 is accomplished by accordingly choosing or correlating the longitudinal dimensional extent of the second bore 65 of the chuck relative to the same dimension of the pin.

The retainer ring 82, the packing 76 and the chuck ring 72 are conjointly so constituted and arranged as to comprise, as pointed out above, a mouth 71 of the gauge 10, which mouth is mutually cooperatively engageable with the housing 114 of the outer valve 104. The gauge, and the mouth thereof, is mutually cooperatively engageable with the housing 114 in such a manner as to preclude the escape of fluid when measurements of the pressure within the inner or outer chambers 142 or 144, respectively, of the pneumatic apparatus 14 are being taken. This result is attained primarily due to the mutual cooperative engagement between the housing 114, at the upper end thereof, and the annular rim 80 of the packing 76. With the chuck 56 positioned longitudinally outwardly of the tube 16, as illustrated in FIGURE 4, the valve actuating pin 88 extends longitudinally of the tube to an extent sufficient to be mutually cooperatively engageable only with the valve actuating stem 126 of the outer valve 104. When the chuck is positioned longitudinally inwardly of the tube 16, as illustrated in FIGURES 2 and 3, the pin 88 extends longitudinally of the tube and protrudes outwardly thereof to an extent sufficient to be mutually cooperatively engageable with the actuating stem 110 of the inner valve 108. Whether the pin 88 is in position mutually cooperatively engaging either one of the inner or outer valves 102 or 104, respectively, the correlated longitudinal dimensional extent of the bore 65, defined by and between the shoulder 64 and the chuck ring 72 (or the shoulder 66), relative to the same dimension of the pin 88, as described above, is, in addition, such as to position the mouth of the chuck 56 in mutual cooperative engagement with the upper end of the housing 114 of the outer valve 104. Stated briefly, the rim 80 of the packing 76 mutually cooperatively engages the housing 114 whether the actuating pin 88 is disposed to actuate the inner valve 102 or the outer valve 104.

As pointed out above, the pressure gauge 10, constructed in accordance with the present invention, is particularly mutually cooperatively engageable with the unitary or common pluralized valve 12, for selectively taking measurements of the pressure within each of the plurality of pressurized chambers 142 and 144 of the plural chamber pneumatic apparatus or tire 14. If it is desired to measure or determine the pressure within the inner chamber 142, the chuck 56 is moved longitudinally inwardly of the tube 16 until the chuck ring 72 abuttingly mutually cooperatively engages the flange 70 of the sleeve 68. The valve cap (not shown) is removed from the housing 114 and the valve core 124 is readily disengaged and removed from therewithin, in any suitable manner, as by the use of a suitable implement (not shown). The gauge 10 is then quickly positioned relative to the upper end of the housing 114, to prevent the loss of too much air from within the outer chamber 144, with the mouth 71 thereof disposed upon and relative to the said upper end. As illustrated in FIGURE 3, the pin 88 extends inwardly of the valve 12 sufficiently to engage the valve actuating stem 110 and open the inner valve 108 upon slightly manually moving or pressing the gauge 10 towards the valve. Pressure from within the chamber 142 is thus communicated through the valve core 108, the housing 114 of the outer valve 104 (the valve core 124 has been removed, as just described), and interiorly of the chuck 56, when pressure is directed against the sealing and pressure responsive means comprising the cup-shaped sealing member 54. As is considered readily apparent, pressure acting against the sealing member 54 forces the same longitudinally of the tube 16, against the bias of the spring 48. The mutual cooperative engagement between the end 42 of the holder 40 and the abutment 38 enables the pressure responsive means to move the indicating stem 34 longitudinally outwardly of the tube 16 to indicate the pressure within the inner chamber 142. In this connection, the surface area of the sealing member 54 and the strength of the spring 48 are calibrated relative to one another and relative to the indicia 36, enabling the stem 34, when moved outwardly of the tube 16, to accurately indicate the pressure being measured.

Once the pressure within the inner chamber 142 has been determined and adjusted, if necessary, the gauge 10 is removed from its position relative to the valve 12 to so measure the pressure within that chamber, as illustrated in FIGURE 3. The valve core 124 is now quickly replaced. Some loss of pressure from within the outer chamber 144 will have occurred. The loss will be small, however, due to the relatively small flow capacity of the port 134. To determine the pressure within the outer chamber 144, the chuck 56 is moved longitudinally outwardly of the tube 16 until the shoulder 64 abuts the flange 70 of the sleeve 68, in which position the chuck will completely contain or encompass the pin 88. With the valve cap (not shown) still removed from the outer housing 114, the gauge 10 is positioned relative thereto, with the mouth 71 thereof in mutual cooperative engagement therewith, as illustrated in FIGURE 4, enabling the pin 88 to mutually cooperatively engage the actuating stem 126 of the outer valve 124. Slight manual movement of the gauge towards the valve will open the same, providing communication to within the gauge 10 through the passage defined by the port 134, the annular passage 132, the port 130, and the valve core 124 of the valve 104, to move the indicating stem 34 longitudinally outwardly thereof, in the same manner as described above, thus indicating, determining or measuring the pressure within the outer chamber 144. Should adjustment of the pressure therewithin be required, the gauge 10 is removed and a suitable pressure supply (not shown) positioned relative to the valve 12 and the outer valve 104 thereof to bring the pressure again to the desired value.

It is considered readily apparent that, since the friction springs 32 maintain the indicating stem 34 in any one of a plurality of indicating positions outwardly of the tube 16, slight manual pressure upon the stem will return it to its non-indicating or inoperative position substantially completely within the tube.

While the invention has been shown, illustrated, described and disclosed in terms of an embodiment or modification which it has assumed in practice, the scope of the invention should not be deemed to be limited by the precise embodiment or modification herein shown, illustrated, described or disclosed, such other embodiments or modifications intended to be reserved especially as they fall within the scope of the claims here appended.

What I claim as my invention is:

1. A portable pressure measuring apparatus comprising:
 a longitudinally dimensionally extensive tube having:
  a radially inturned end, and
  an aperture extending therethrough;
 a plug positioned within the tube upon the end thereof and having:
  an extension at one end thereof disposed within the aperture extending through the end of said tube, said extension having:
   an aperture extending therethrough;
  a spring retainer disposed in overlying relationship relative to another end of said plug, said retainer having:
   an aperture extending therethrough coaxially aligned with the aperture in said extension;
 an indicating stem disposed within said tube, and through the aperture in each of said retainer and extension, in longitudinal sliding relationship relative thereto, said stem being guided in its movement longitudinally of said tube by said spring retainer and extension and having:
  indicia markings thereupon, and
  a radially enlarged abutment at one end thereof;
 friction means positioned within said plug frictionally engaging said stem for maintaining the same in any one of a plurality of positions, said friction means comprising:
  a plurality of friction springs;
 sealing and pressure responsive actuating means positioned within the tube for precluding the passage of fluid thereby and actuating said indicating stem to any one of a plurality of indicating positions in response to fluid pressure, said sealing and pressure responsive means comprising:
  a holder having:
   an end that is mutually cooperatively engageable with said abutment,
   a plurality of radially outwardly extending flanges, one of said flanges being radially dimensionally greater than the other and,
   a rod extending between said flanges; and
  a cup-shaped sealing member disposed about said rod and between said flanges, said member being sealingly mutually cooperatively engageable with the tube and longitudinally slidably disposed relative thereto and being responsive to fluid pressure to actuate said stem outwardly of said tube to any one of a plurality of indicating positions;
 biasing means positioned within said tube between said spring retainer and one of said plurality of radially outwardly extending flanges for biasing said holder to a position relative to said tube enabling said indicating stem to be substantially completely contained therewithin;
 a chuck positioned upon and about said tube in longitudinal sliding relationship relative thereto, said chuck comprising:
  a first bore,
  a second bore, and
  a third bore,
 said third bore being of greater diametric dimensional extent than said second bore and said second bore being of greater diametric dimensional extent than said first bore, the diametric dimensional extent of said first bore being substantially equal to that of said tube;
 abutment means for determining the limit of movement of said chuck in each of a plurality of directions longitudinally of said tube, said abutment means comprising:
  a sleeve disposed within said tube having:
   a radially outwardly extending flange positioned in overlying relationship relative to said tube at and upon an end thereof opposite said radially inturned end;
  a first shoulder defined by and between said first and second bores,
  the diametric dimensional extent of said flange being greater than that of said tube and substantially equal to that of said second bore, and
  a chuck ring positioned within said chuck and upon a second shoulder defined by and between said second and third bores,
 said flange being abuttingly mutually cooperatively engageable with said first shoulder to define the limit of movement of said chuck in one of a plurality of directions longitudinally of said tube and with said chuck ring to define the limit of movement of said chuck in another of said plurality of directions longitudinally of said tube;

said chuck further comprising:
- a mouth positioned within said chuck ring, said mouth comprising, in turn:
  - a washer having a centrally disposed aperture,
  - a packing ring positioned upon said washer and within said chuck ring, said packing ring having:
    - a generally centrally disposed aperture extending therethrough of greater diametric dimensional extent than the aperture through said washer, and
    - an outwardly and annularly extending contact rim; and
  - a retainer ring positioned within said chuck ring in press-fitted relationship therewith and upon said packing ring to retain the latter therewithin, said retainer ring having:
    - a generally centrally disposed aperture extending therethrough of greater diametric dimensional extent than the aperture extending through said packing ring;
- a valve actuating pin fixedly positioned relative to said tube and disposed to extend outwardly thereof through said mouth, said pin comprising:
  - a base disposed within said sleeve in press-fitted relationship relative thereto,
  - said base being so configured and arranged as to provide a fluid passageway through said sleeve to direct fluid pressure upon said sealing and pressure responsive means;

said base being abuttingly mutually cooperatively engageable with that one of the flanges of said holder of less diametric dimensional extent to define the limit of movement of the holder in a direction longitudinally of the tube enabling the indicating stem to be substantially completely disposed within and relative to the said tube;

the longitudinal dimensional extent of the second bore being chosen, relative to the same dimension of said valve actuating pin, so as to enable the pin to extend outwardly of the chuck when the latter is in one of its plurality of positions longitudinally of said tube and to be completely encompassed by said chuck when the latter is in another of its positions longitudinally of said tube; and the diametric dimensional extent of the aperture through said washer being substantially equal to the same dimension of said pin to preclude flexure thereof.

2. In combination with a pneumatic apparatus having a plurality of chambers wherein a fluid may be confined;

unitary pluralized valving means for introducing a fluid into each of said chambers, said valving means comprising:
- a plurality of valves corresponding to said plurality of chambers superimposed relative to one another within a sleeve member; and pressure measuring means for measuring the pressure of the fluid within one of said plurality of said chambers independently of the other chambers upon mutual cooperative engagement with the valve corresponding to said one chamber, said pressure means comprising:
- a tube;
- an indicating stem disposed within said tube in movable relationship relative thereto to any one of a plurality of indicating positions;
- a chuck providing an extension at one end of said tube, said chuck having an end adapted for sealing engagement with said sleeve member;
- valve actuating pin means co-operable with any one of the plurality of valves while said chuck is in sealing engagement with said sleeve, whereby fluid may be conducted from any one of said chambers through said chuck and into said tube, and said indicating stem is thereby moved to an indicating position;

said chuck is positioned upon and about said tube in longitudinal sliding relationship relative thereto; and said valve actuating pin means comprises a valve actuating pin fixedly positioned relative to said tube and disposed to extend outwardly thereof;

said valve actuating pin extending outwardly of said chuck when the latter is in one of a plurality of positions longitudinally of said tube and being mutually cooperatively engaging one of the plurality of valves of said valving means, and being completely encompassed by said chuck when the latter is in another of its plurality of positions longitudinally of said tube and mutually cooperatively engaging another of the plurality of valves of said valving means.

3. In the combination as defined in claim 2, wherein there is provided:
abutment means for determining the limit of movement of said chuck in each of a plurality of directions longitudinally of said tube.

4. In combination:
a pneumatic vehicle tire having:
a plurality of chambers wherein a fluid may be confined;
unitary pluralized valving means for introducing a fluid into each of said chambers, said valve means comprising:
- a plurality of valves superimposed relative to one another; and pressure measuring means for measuring the pressure of the fluid within each of said plurality of chambers upon mutual cooperative engagement with said valving means, said pressure measuring means comprising:
a tube;
an indicating stem disposed within said tube in moveable relationship relative thereto to any one of a plurality of indicating positions;
a chuck positioned upon and about said tube in longitudinal sliding relationship relative thereto;
sealing and pressure responsive actuating means positioned within the tube for precluding the passage of fluid thereby and actuating said indicating stem to any one of said plurality of indicating positions in response to fluid pressure;
abutment means for determining the limit of movement of said chuck in each of a plurality of directions longitudinally of said tube; and
a valve actuating pin fixedly positioned relative to said tube and disposed to extend outwardly thereof;
said valve actuating pin extending outwardly of said chuck when the latter is in one of a plurality of positions longitudinally of said tube and being mutually cooperatively engageable with one of the plurality of valves of said valving means, and being completely encompassed by said chuck when the latter is in another of its positions longitudinally of said tube and mutually cooperatively engageable with another of the plurality of valves of said valving means.

5. In combination with a pneumatic apparatus having a plurality of chambers within each of which a fluid may be confined:
unitary pluralized valving means for introducing a fluid into each of said chambers, said valve means comprising:
- a plurality of valves superimposed relative to one another; and pressure measuring means for measuring the pressure of the fluid within each of said plurality of chambers upon mutual cooperative engagement with said valving means, said pressure measuring means comprising:
a tube;
an indicating stem disposed within said tube in moveable relationship relative thereto to any one of a plurality of indicating positions;
a chuck positioned upon and about said tube in longitudinal sliding relationship relative thereto;
sealing and pressure responsive actuating means positioned within the tube for precluding the passage of fluid thereby and actuating said indicating stem to any one of said plurality of indicating positions in response to fluid pressure;
abutment means for determining the limit of movement of said chuck in each of a plurality of directions longitudinally of said tube; and
a valve actuating pin fixedly positioned relative to said tube and disposed to extend outwardly thereof;
said valve actuating pin extending outwardly of said chuck when the latter is in one of a plurality of positions longitudinally of said tube and being mutually cooperatively engageable with one of the plurality of valves of said valving means, and being completely encompassed by said chuck when the latter is in another of its positions longitudinally of said tube and mutually cooperatively engageable with another of the plurality of valves of said valving means.

6. A pressure measuring gauge for measuring the pressure of a fluid confined within each of a plurality of chambers of a pneumatic apparatus comprising:
a tube;
an indicating stem disposed within said tube in moveable relationship relative thereto to any one of a plurality of indicating positions;
a chuck positioned upon and about said tube in longitudinal sliding relationship relative thereto; and
a valve actuating pin fixedly positioned relative to said tube and disposed to extend outwardly thereof;
said valve actuating pin extending outwardly of said chuck when the latter is in one of a plurality of positions longitudinally of said tube and being mutually cooperatively engageable with one of a plurality of superimposed valves of a valving means, and being completely encompassed by said chuck when the latter is in another of its plurality of positions longitudinally of said tube and mutually cooperatively engaging another of said plurality of superimposed valves.

7. A pressure measuring gauge as defined in claim 6, wherein there is provided:
sealing and pressure responsive actuating means positioned within the tube for precluding the passage of fluid thereby and actuating said indicating stem to any one of said plurality of indicating positions in response to fluid pressure.

8. A pressure measuring gauge as defined in claim 7, wherein:
said sealing and pressure responsive actuating means comprises:
a holder mutally cooperatively engageable with said indicating stem, and
a sealing member disposed about and upon said holder, said member being sealingly mutually cooperatively engageable with said tube and longitudinally slidably disposed relative thereto and being responsive to a fluid pressure to actuate said indicating stem to any one of said plurality of indicating positions.

9. A pressure measuring gauge as defined in claim 8, wherein there is provided:
abutment means for determining the limit of movement of said chuck in each of a plurality of directions longitudinally of said tube.

10. A pressure measuring gauge as defined in claim 9, wherein:
said abutment means comprises:
a sleeve disposed within said tube having:
a flange positioned in overlying relationship relative to said tube at an end thereof;
a first shoulder defined by and between a first plurality of bores disposed within and along said chuck, and
a chuck ring positioned within said chuck and upon a second shoulder defined by and between another plurality of bores disposed therewithin and therealong,
said flange being abuttingly mutually cooperatively engageable with said first shoulder to define the limit of movement of said chuck in one of a plurality of directions longitudinally of said tube and with said chuck ring to define the limit of movement of said chuck in another of said plurality of directions longitudinally of said tube.

11. A pressure measuring gauge for measuring the pressure of a fluid confined within each of a plurality of chambers of a pneumatic apparatus comprising:
a tube;
an indicating stem disposed within said tube in moveable relationship relative thereto to any one of a plurality of indicating positions;
a chuck positioned upon and about said tube in longitudinal sliding relationship relative thereto;
sealing and pressure responsive actuating means positioned within the tube for precluding the passage of fluid thereby and actuating said indicating stem to any one of said plurality of indicating positions in response to fluid pressure, said means comprising:
a holder mutually cooperaively engageable with said indicating stem, and
a sealing member disposed about and upon said holder, said member being sealingly mutually cooperatively engageable with said tube and longitudinally slidable disposed relative thereto and being responsive to a fluid pressure to actuate said indicating stem to any one of said plurality of indicating positions;
abutment means for determining the limit of movement of said chuck in each of a plurality of directions longitudinally of said tube, said last-named means comprising:
a sleeve disposed within said tube having:
a flange positioned in overlying relationship relative to said tube at an end thereof;
a first shoulder defined by and between a first plurality of bores disposed within and along said chuck, and
a chuck ring positioned within said chuck and upon a second shoulder defined by and between another plurality of bores disposed therewithin and therealong,
said flange being abuttingly mutually cooperatively engageable with said first shoulder to define the limit of movement of said chuck in one of a plurality of directions longitudinally of said tube and with said chuck ring to define the limit of movement of said chuck in another of said plurality of directions longitudinally of said tube; and
a valve actuating pin fixedly positioned relative to said tube and disposed to extend outwardly thereof;
said valve actuating pin extending outwardly of said chuck when the latter is in one of a plurality of positions longitudinally of said tube and being mutually cooperatively engageable with one of a plurality of superimposed valves of a valving means, and being completely encompassed by said chuck when the latter in another of its plurality of positions longitudinally of said tube and mutually cooperatively engageable with another of said plurality of superimposed valves.

12. A pressure measuring gauge for measuring the pressure of a fluid confined within each of a plurality of chambers of a pneumatic apparatus comprising:
a tube;
an indicating stem disposed within said tube in movable relationship relative thereto any one of a plurality of indicating positions;

a chuck positioned upon and about said tube in moveable relationship thereto; and a valve actuating pin fixedly positioned relative to said tube and disposed to extend outwardly thereof;

said valve actuating pin extending outwardly of said chuck when the latter is in one of a plurality of positions longitudinally of said tube and being mutually cooperatively engageable with one of a plurality of superimposed valves of a valving means, and being completely encompassed by said chuck when the latter is in another of its plurality of positions longitudinally of said tube and mutually cooperatively engaging another of said plurality of superimposed valves.

References Cited by the Examiner

UNITED STATES PATENTS

| 2,047,405 | 7/1936 | Byars | 137—227 |
| 2,272,548 | 2/1942 | Creamer | 137—454.5 |
| 3,067,618 | 12/1962 | Briechle | 73—419 |

LOUIS R. PRINCE, *Primary Examiner.*

D. O. WOODIEL, *Assistant Examiner.*